Nov. 18, 1947.  J. C. THOMAS, JR  2,431,090
DUMPING CARRIER
Filed March 26, 1945  2 Sheets-Sheet 2

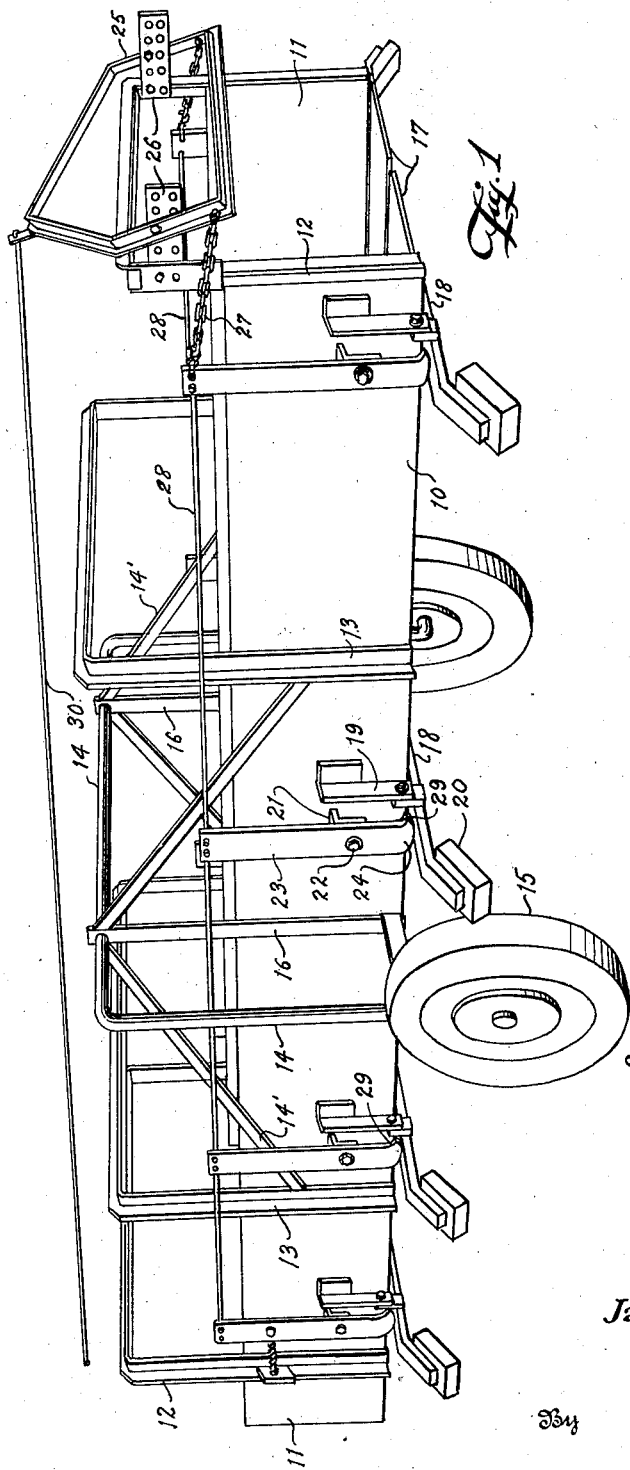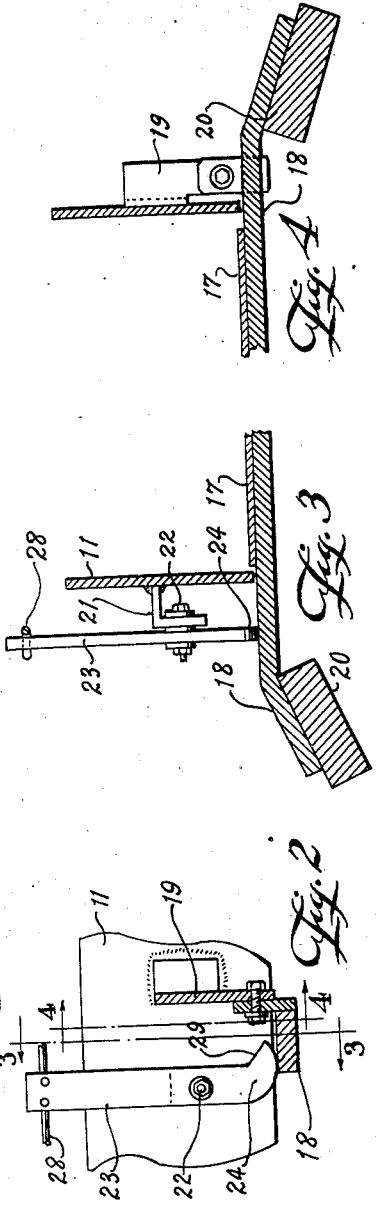

James C. Thomas, Jr. Inventor

By Jack A. Ashley
Joseph H. Achley
Attorneys

Patented Nov. 18, 1947

2,431,090

UNITED STATES PATENT OFFICE 2,431,090

DUMPING CARRIER

James C. Thomas, Jr., Plainview, Tex.

Application March 26, 1945, Serial No. 584,828

15 Claims. (Cl. 298—35)

1

This invention relates to new and useful improvements in dumping carriers.

One object of the invention is to provide an improved dumping carrier in the form of a trailer adapted to be attached to the rear end of a portable hay baler to successively receive bales of hay therefrom in the same upright positions in which such bales are formed and having a dumping bottom, whereby an accumulation of bales may be periodically dumped upon the ground in the same upright positions in which such bales are produced.

Another object of the invention is to provide a dumping carrier having longitudinally hinged counter-balanced bed sections and latch means for holding said sections in loading position, arranged to be released to permit the load of bales to swing the sections downwardly and dump said bales; the counter-balanced sections swinging upwardly and being automatically latched when the carrier is moved away from the dumped bales.

A further object of the invention is to provide latching means having a common operating member mounted on the carrier in the path of the first bale received by the carrier, whereby when a predetermined number of bales have been received and said first bale has been pushed along the carrier by succeeding bales, said first bale will engage and operate said member to automatically actuate the latching means to dump the bales.

Still another object of the invention is to provide a portable support for the carrier including ground wheels, whereby cross members which might interfere with the fall of the bales are eliminated and the wheels are spaced apart so as to freely clear the dumped bales when the carrier is moved forwardly.

A construction designed to carry out the invention will be hereinafter described together with other features of the invention.

Figure 5:
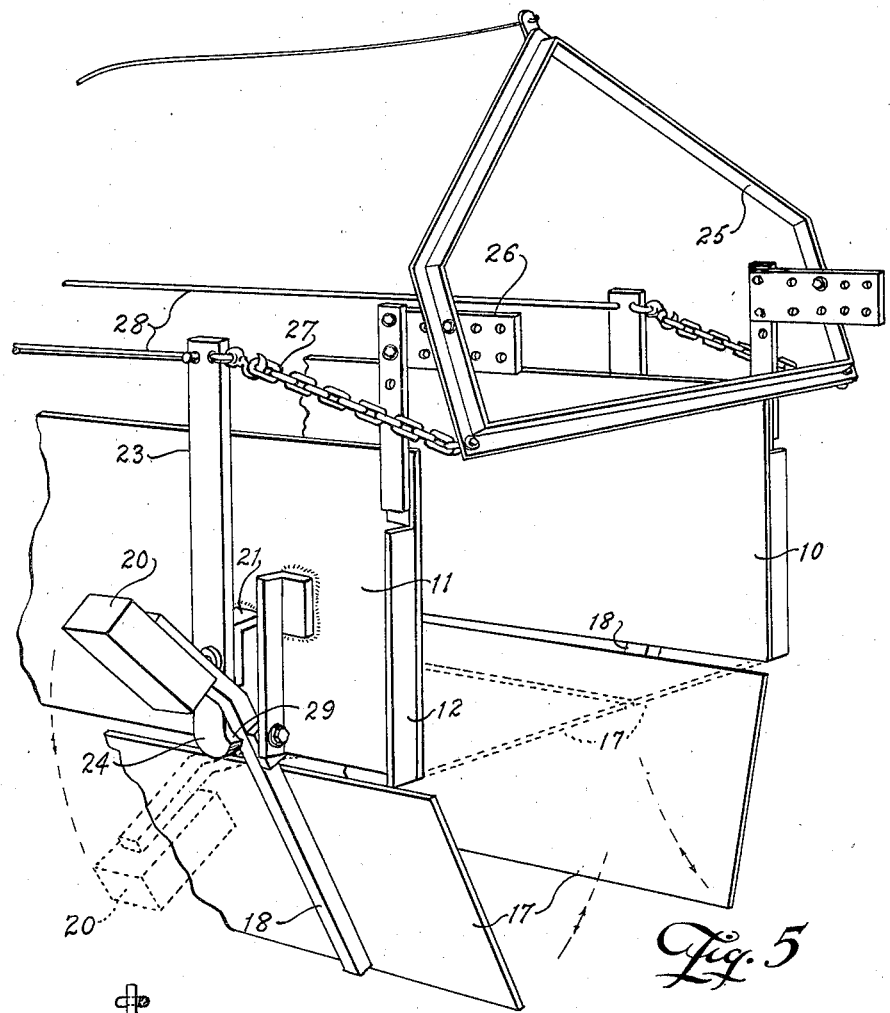

The invention will be more readily understood from a reading of the following specification and by reference to the accompanying drawings, wherein an example of the invention is shown, and wherein:

Fig. 1 is a perspective view of a dumping carrier constructed in accordance with the invention, Fig. 2 is an elevation showing one of the latch mechanisms, Fig. 3 is a transverse sectional view taken on the line 3—3 of Fig. 2, Fig. 4 is a similar view taken on the line 4—4 of Fig. 2, Fig. 5 is a perspective view of the rear end of

Figure 6:
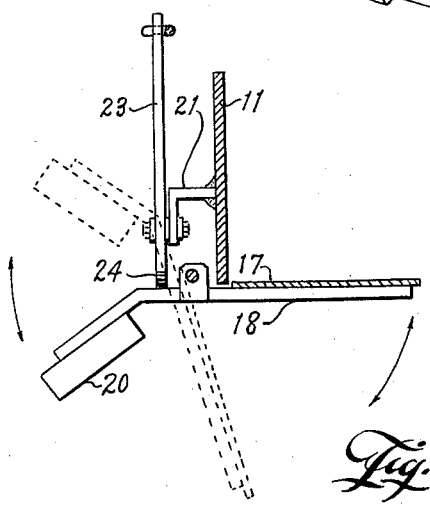

2 the carrier in dumping position, the loaded position being indicated in dotted lines, and Fig. 6 is a transverse sectional view through one side of the carrier showing the parts in loaded position in full lines and the dumping position in dotted lines.

In the drawings, the numeral 10 designates generally, a trailer or movable carrier body. The trailer is provided with upright side boards or panels 11 extending longitudinally along each side from end to end. It is preferable to make these panels of heavy sheet metal or suitably fabricated sections and thus, various elements may be welded thereto; however, the invention is not to be limited to metal and wooden side boards may be used.

In view of the fact that there must be no obstructing cross members between the side panels, upright yoke-shaped braces 12 are transversely secured across the ends of the panels and similar braces 13 are disposed intermediate the ends of said panels. These braces are high enough to permit the bales to freely move thereunder. The lower ends of the braces are welded or otherwise secured to the outer faces of the panels. The front ends of the panels are adapted to be attached to the guides of a hay baler (not shown) and the panels are preferably alined therewith so that the bales are held in alinement when discharged into the trailer.

For supporting the trailer, an inverted U-shaped axle 14 is mounted in the center thereof. This axle is supported at its lower ends in ground wheels 15 and is sufficiently wide to space the wheels outwardly of the panels so as to provide ample dumping space between said wheels. Hangers 16 depend from the axle and are secured to the outer faces of the panel, whereby the body is suspended or supported. The axle is held against rocking by inclined braces 14' extending from the top thereof down to the panels, to which they are suitably secured. The structure which has been described provides a trailer body which is U-shaped in cross section and open from end to end.

A pair of bed or bottom sections 17 are hinged longitudinally along the bottom edges of the panels and have their inner longitudinal edges, either abutting or in close proximity. These sections are normally supported in substantially longitudinal and horizontal alinement with the discharge end of the baler so that the bales of hay may freely slide onto said sections. While it is preferable to form the sections of sheet metal, they may be made of wood. Any suitable type of hitch may be employed for attaching the trailer to the baler.

For supporting and hinging the bed sections 17, bolster bars 18 are pivoted medially on the lower ends of upright hangers 19, welded to the outer faces of the panels 11. These bars are welded or otherwise secured to the undersides of the sections 17, transversely thereof and are located adjacent each end of said sections and between the axle 14 and the ends of the sections; the bars on one side being transversely alined with the bars in the other side. A short distance outwardly of its pivot point, each bar is bent downwardly at an angle and a counter-baling weight 20 is fastened thereon. These weights are heavy enough to swing the bed sections to a horizontal position after the bales have been dumped and the trailer moved forwardly to clear said bales.

Adjacent each hanger 19 and forwardly thereof, an outwardly directed arm 21 is welded to the panel 11. Each arm has a reduced stud 22 on its outer end for pivotally supporting a latch lever 23. These levers are pivoted nearer their lower ends and each lever has a curved shoe 24 formed on its lower end adapted to swing over the adjacent bolster bar 18 and limit its upward swing. The arms 20 are close enough to the hangers 19 and the shoes 24 are sufficiently wide, that when the levers are swung to a vertical position, said shoes will overhang the bolster bars and latch the bed sections in place to support bales.

It is desirable to dump the bales without requiring a workman to go back to the trailer for this puropse. A rectangular dumping frame 25 is pivoted above its transverse center on brackets 26 projecting rearwardly from the upper portion of the rear brace 12, so that the lower portion of said frame is in the path of the bales which are slid rearwardly along the bed sections. The first bale received in the trailer from the baler will be pushed rearwardly by the following bales and when the trailer is fully loaded this first bale will engage the lower end of the frame 25 and swing it outwardly.

The rear latch levers 23 are connected at their upper ends with the frame by means of chains 27 and the upper ends of these levers are connected with the upper ends of the remaining levers by links 28. Thus, when the frame is swung, all of the latch levers are swung so as to move their shoes 24 forwardly, thereby releasing the bolster bars 18 and permitting the bales to swing the bed sections 17 downwardly, whereby the bales are dumped on the ground. The shoes 24 and the lower ends of the latch levers are heavy enough to swing said levers to a vertical position when the bales have been dumped and the frame 25 swings back to its normal position. Since the panels 17 cannot swing upwardly because of the bales resting on the ground therebetween, the outer portions of the bolster bars will lie above the bills 29 of the shoes 24 and the rear edges of the latch levers will rest against said bars.

When the trailer is moved forwardly, beyond the dumped bales, the counter weights 20 will swing the bars 18 downwardly and bring the bed sections 17 to a horizontal position. As the bars swing downwardly they will engage the bills 29 and momentarily displace the shoes so that when the bars pass, said shoes will swing thereover and latch said bars in place. From the foregoing it will be seen that the releasing and latching of the bars is automatic. If desired, a flexible line 30 may be attached to the top of the frame 25 and carried forwardly over the braces and axle to the baler, whereby the said frame may be manually swung.

In using the trailer it is suitably hitched to the rear end of an ordinary portable hay baler, so that when the baler travels along a field, the trailer will be pulled therewith. The trailer is close coupled to the baler so that as a bale is completed it is pushed rearwardly onto the front ends of the bed sections 17 and guided between the side panels 11. The bales are pushed rearwardly in the trailer until the first bale received engages and swings the frame 25.

When the frame 25 is swung, the chains 27 pull the upper ends of the rearmost latch levers 23, rearwardly, whereby the upper ends of the remaining levers 23 are swung rearwardly by the links 28. The shoes 24 of the levers are swung forwardly thereby releasing the bolster bars 18. The weight of the bales overcomes the counter balancing weights 20, thus swinging the bed sections 17 downwardly.

It will be observed that the bales are originally received from the baler in the same upright position in which they are formed and are maintained in this position by the panels 11. When the panels swing downwardly, the bales slide downwardly and land on the ground in the same upright position. This is of advantage because they will weather better if left in the same position in which they are formed.

Owing to the distance above the ground at which the bed sections are hinged to the panels, said sections hang on each side of the dumped bales and the trailer must be moved forwardly to free said sections. It will be observed that the sections hang substantially perpendicular because the panels are spaced apart a distance substantially the same as the width of the bale, thus the trailer may be moved forwardly without interference from said bales. When the bed sections are free of the dumped bales, the counter weights 20 will swing said sections to a closed position, after which they will be latched. It is not necessary to stop baling as the traveling speed of the baler will cause the carrier to pass by the dumped bales before another complete bale is pushed onto the carrier.

The trailer may be made long enough to accommodate several bales. It prevents bales discharged from the baler, falling on the ground and turning over. It also dumps the bales in groups instead of stringing them along the field, thus making subsequent gathering more orderly and less tedious. The bales are dumped in longitudinal alinement and due to the fact that they slide down the faces of the downwardly swinging bed sections, said bales will reach the ground in end-to-end contact as well as in a windrow. It has been found that such dumping better protects the bales against the elements of the weather. The dumping and latching being automatic saves time and labor.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A dumping carrier including, a mobile body, bed sections extending longitudinally of the body, cross members hinged to the body and supporting said bed sections, latches carried by the body for holding the cross members against swinging downwardly, weights attached to the cross members outwardly of their hinge points, and means for simultaneously releasing said latches to permit the bed sections and the cross members to swing downwardly and dump a load.

2. A dumping carrier including, an elongate mobile body, bed sections extending longitudinally of said body disposed to swing downwardly to each side of the body, means for hinging the outer longitudinal edge portions of the bed sections to the body, latches carried by the body for holding the bed sections against swinging downwardly, means for releasing the latches to permit the bed sections to swing downwardly to dump the load, and weight members connected with the bed sections outwardly of their hinge points to swing the bed sections upwardly to latching position.

3. A dumping carrier as set forth in claim 1, wherein the latch releasing means includes an operator mounted on the body in the path of the load disposed to be engaged and operated by the load.

4. A dumping carrier as set forth in claim 2, wherein the latch releasing means includes an operator mounted on the body in the path of the load disposed to be engaged and operated by the load.

5. A carrier as set forth in claim 1, with ground wheels offset outwardly and transversely of the body.

6. A dumping carrier including, an elongate mobile body having upright side panels, bed sections extending longitudinally of said body substantially flush when in loading position, said bed sections being disposed to swing downwardly to each side of the body, means for hinging the outer longitudinal edge portions of the bed sections to the panels, latches carried by the body for holding the bed sections against swinging downwardly, means for releasing the latches to permit the bed sections to swing downwardly to dump the load, and weight members connected with the bed sections outwardly of their hinge points to swing the bed sections upwardly to latching position.

7. A dumping carrier including, an elongate mobile body having oppositely swinging longitudinal bed sections and adapted to progressively receive bales of material, weight members attached to the bed sections for swinging said sections upwardly, means for latching the bed sections against swinging downwardly, and means mounted on the body operably connected with the latching means in the path of the foremost bale adapted to be moved by said bale to actuate the latching means.

8. A dumping carrier including, an elongate mobile body, bed sections extending longitudinally of said body and hinged to swing downwardly to each side of said body, means for counterbalancing said bed sections to hold them in loading position and returning them to loading position after being dumped, means for latching the bed sections in loading position, and means on the body for releasing said latching means.

9. A dumping carrier including, an elongate mobile body, bed sections extending longitudinally of said body and hinged to swing downwardly to each side of said body, means for counterbalancing said bed sections to hold them in loading position and returning them to loading position after being dumped, latches carried by the body resisting upward swinging of the counterbalancing means and downward swinging of the bed sections, and means for releasing the latching means.

10. A dumping carrier including, an elongate mobile body having upright side members, hangers carried by the side members of the body, cross members hinged intermediate their ends on the hangers, each cross member extending outwardly of one of the side members of the body and inwardly to the longitudinal medial portion of the body, bed sections extending longitudinally of the body on each side of the longitudinal center thereof and secured to the inwardly extending portions of the cross members, counter balancing weights mounted on the outwardly extending portions of the cross members, and latches mounted on the side members of the body engaging the cross members between each bed section and the hinge points of the cross members.

11. A dumping carrier as set forth in claim 10 and means mounted on the body for simultaneously moving the latches to release the bed sections for dumping.

12. A dumping carrier including, a body adapted to receive a progressing load having an inverted substantially U-shape in cross section, whereby it is open from end to end and free from transverse obstructions to dumping, longitudinal bed sections, counter balanced supports for the bed sections hinged at the sides of the body, latches on the sides of the body for holding said supports to maintain the bed sections in horizontal position, and means in the path of the load for releasing said latches.

13. A dumping carrier as set forth in claim 12, with an inverted U-shaped axle having ground wheels at its lower ends, and means for suspending the body from said axle.

14. A dumping carrier as set forth in claim 12, with an inverted U-shaped axle having ground wheels at its lower ends, means for suspending the body from said axle, and braces extending from the axle to the body.

15. A dumping vehicle including, an elongate body adapted to receive a progressing load, a floor on the body, transverse supports for the floor hinged to the body having weight members disposed outwardly of the body, latches carried by the body and engaging said supports to hold the floor in loading position, and means for releasing said latches to permit the load to swing the floor downwardly to dump the load.

JAMES C. THOMAS, Jr.

REFERENCES CITED

The following references are of record in the file of this patent:

UNITED STATES PATENTS

| Number | Name | Date |
|---|---|---|
| 404,957 | Busse | June 11, 1889 |
| 903,207 | Leisner | Nov. 10, 1908 |